G. W. DREW.
FEEDER FOR FRUIT SLICING MACHINES.
APPLICATION FILED NOV. 15, 1916.

1,266,668.

Patented May 21, 1918.
4 SHEETS—SHEET 1.

INVENTOR.
George W. Drew

G. W. DREW.
FEEDER FOR FRUIT SLICING MACHINES.
APPLICATION FILED NOV. 15, 1916.
1,266,668.
Patented May 21, 1918.
4 SHEETS—SHEET 2.
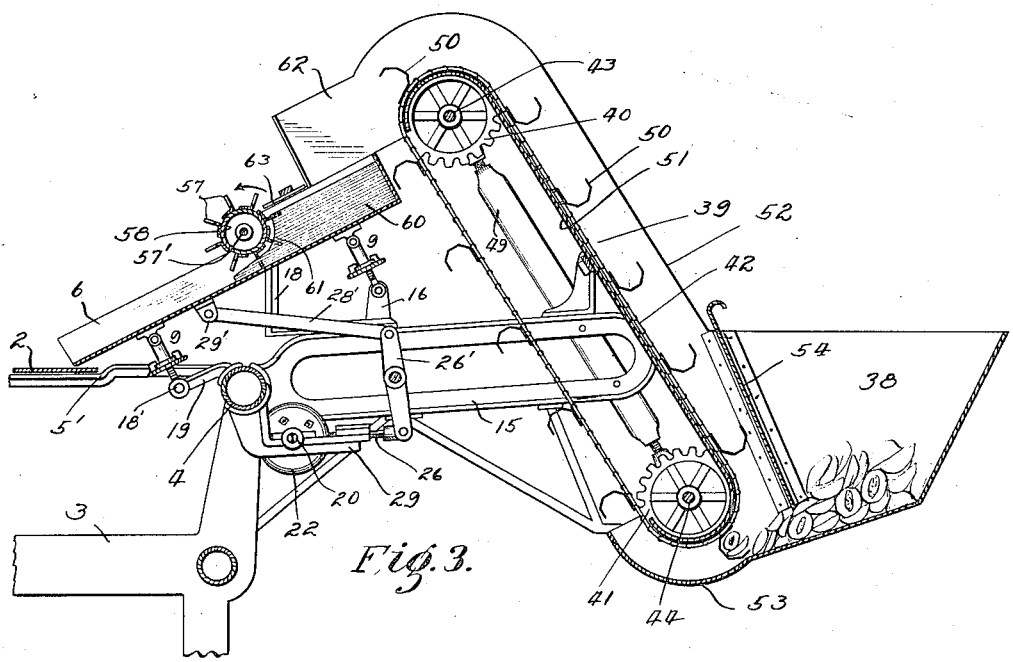
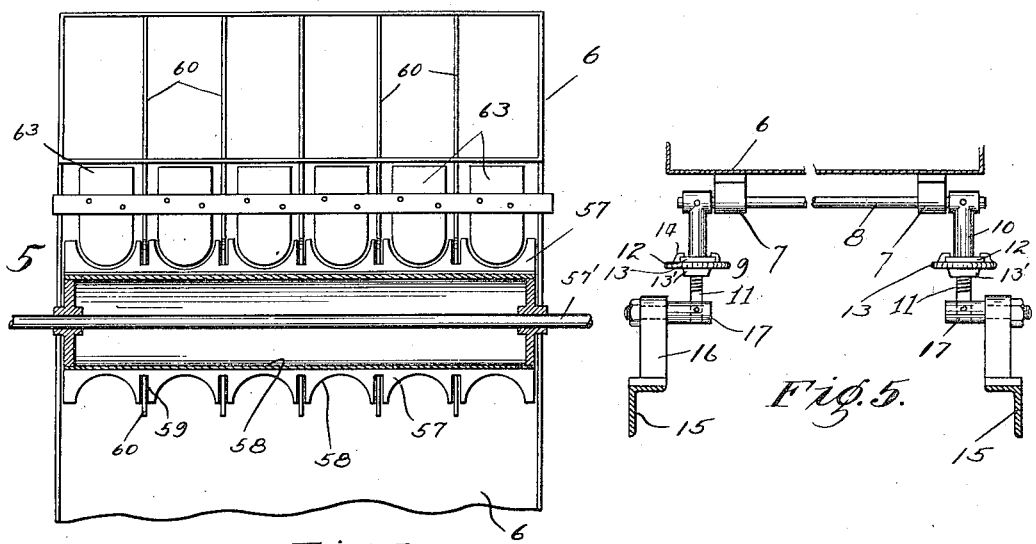
INVENTOR.
George W. Drew.

G. W. DREW.
FEEDER FOR FRUIT SLICING MACHINES.
APPLICATION FILED NOV. 15, 1916.
1,266,668.
Patented May 21, 1918.
4 SHEETS—SHEET 3.
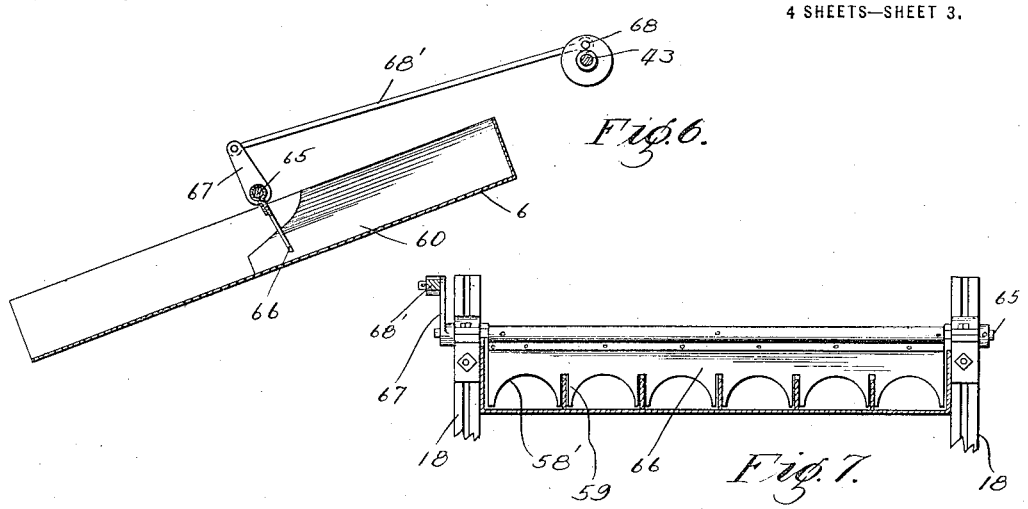
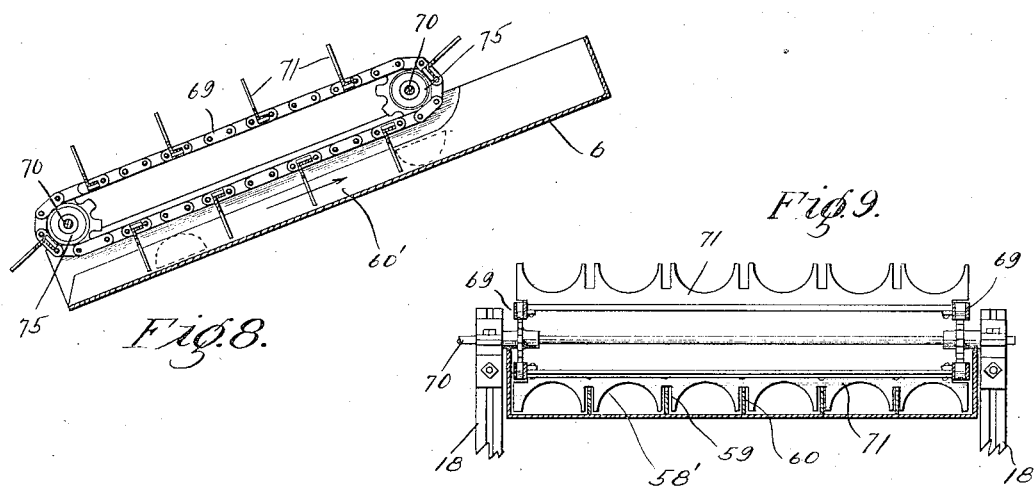
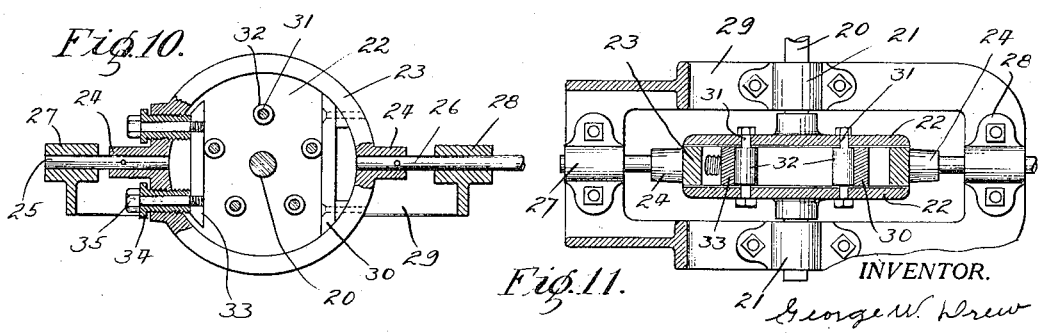
INVENTOR.
George W. Drew G. W. DREW.
FEEDER FOR FRUIT SLICING MACHINES.
APPLICATION FILED NOV. 15, 1916.
1,266,668.
Patented May 21, 1918.
4 SHEETS—SHEET 4.
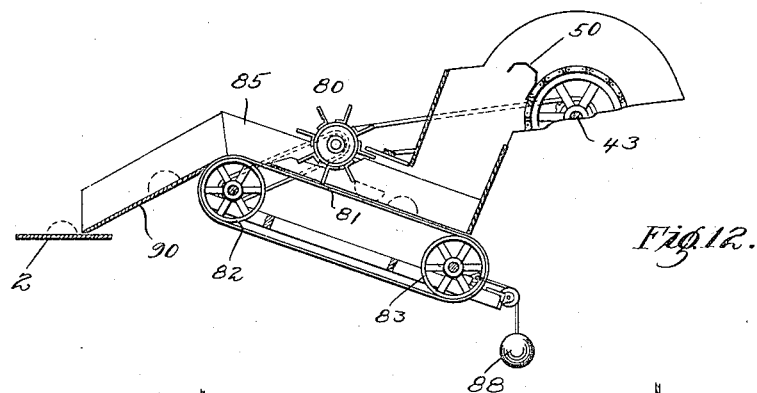
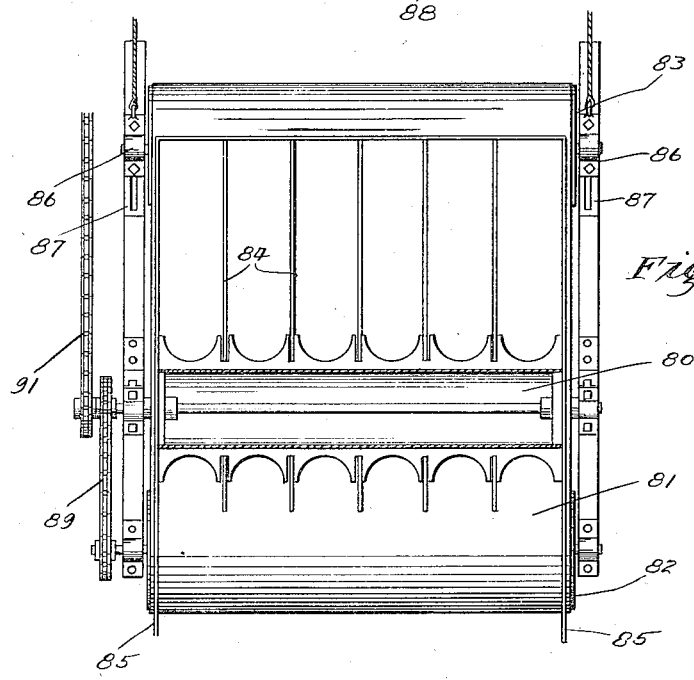
INVENTOR.
George W. Drew though the inclined feed chute showing the
UNITED STATES PATENT OFFICE.

GEORGE W. DREW, OF OAKLAND, CALIFORNIA.

FEEDER FOR FRUIT-SLICING MACHINES.

1,266,668. Specification of Letters Patent. Patented May 21, 1918.

Application filed November 15, 1916. Serial No. 131,574.

*To all whom it may concern:*

Be it known that I, GEORGE W. DREW, a citizen of the United States, residing at Oakland, in the county of Alameda and State of California, have invented certain new and useful Improvements in Feeders for Fruit-Slicing Machines, of which the following is a specification.

This invention relates to improvements in machines for feeding fruit slicers, and more particularly to a machine of this character adapted to operate on pieces of fruit which are substantially semi-spherical in shape, so that the pieces are fed into the slicer all in the same relative position.

This device is intended to operate in conjunction with the slicing machine shown in my co-pending application Serial No. 831,187, filed April 11, 1914, and as there described the fruit must be placed on the conveyer belt with the flat side down.

The principal object of my present invention is to provide a device which will receive the fruit as it comes from the previous operation and arrange it so all pieces are fed to the belt of the slicing machine, flat side down.

Another object is to provide an improved form of conveyer by which the pieces of fruit are fed to the turning mechanism at a rate not in excess of that which this mechanism can handle.

Another object is to provide a mechanism which will turn the variously arranged pieces of fruit all in the same direction without crushing or injuring the same.

A further object is provide a mounting for the chute forming a part of the turning mechanism, which will permit of adjustment as to inclination and at the same time allow vibrations to be imparted to it. And a still further object is to provide an improved mechanism for imparting vibrations to the above mentioned chute.

With these and other objects in view, my invention consists of certain novel features of construction, combinations and arrangements of parts as more particularly decribed in the following specification and pointed out in the appended claims.

Reference being had to the drawings forming a part of this specification;

Fig. 3 is a view in sectional elevation showing the arrangement of feed conveyer and the turning mechanism.

Fig. 4 is a view partly in plan and partly in section of the turning mechanism.

Fig. 5 is a view in transverse section through the inclined feed chute showing the manner of mounting the same.

Fig. 6 is a longitudinal section through a modified form of turning mechanism.

Fig. 7 is a transverse section through the same.

Fig. 8 is a view in longitudinal section through another form of mechanism for turning the fruit.

Fig. 9 is a transverse section through the last mentioned form.

Fig. 10 is a view in section through the mechanism for shaking the chute.

Fig. 11 is a view in section taken at right angle to that in Fig. 10.

Fig. 12 is a view in section of another modification of the turning mechanism.

Fig. 13 is a view in plan of the latter mechanism.

Referring to corresponding parts in the several views by the same numerals of reference, 1 denotes in general the frame of a slicing machine, to which my invention is applied in order to deliver the pieces of fruit all in one arrangement. The slicing machine is provided with a belt 2 by which the fruit is carried to the cutting knives not here shown. The frame 1 is composed of the members 3, connected by longitudinal members 4 and extending between the latter are the cross braces 5' that serve also to support the belt 2. The frame thus described serves not only for the slicing machine but also for the mechanism which is the subject of my invention.

Figure 1:
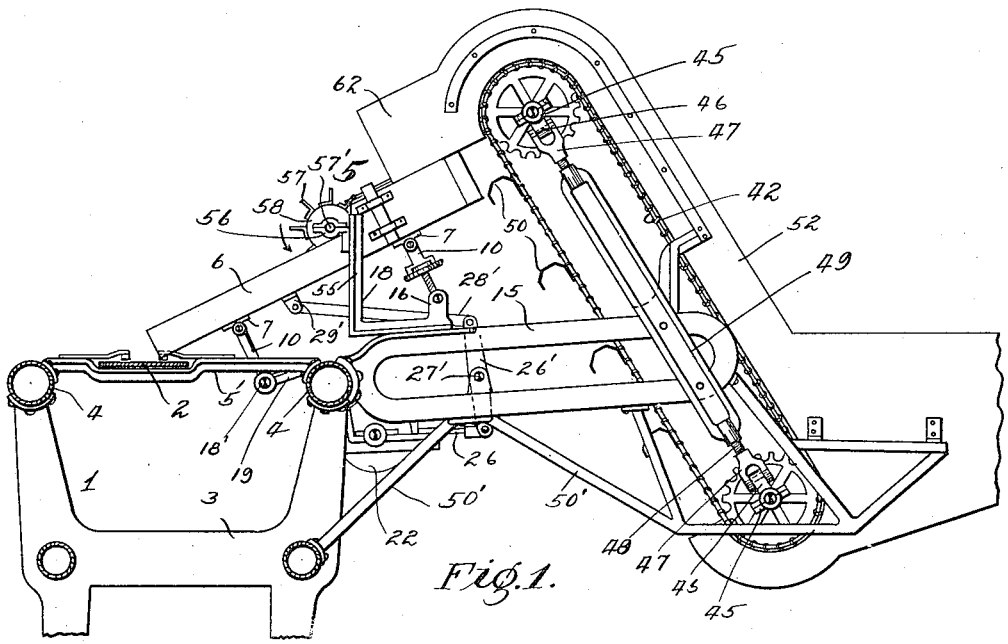
Figure 1 is a view in side elevation of my improved device showing it connected to a slicing machine, the frame whereof is shown in section.
Figure 2:
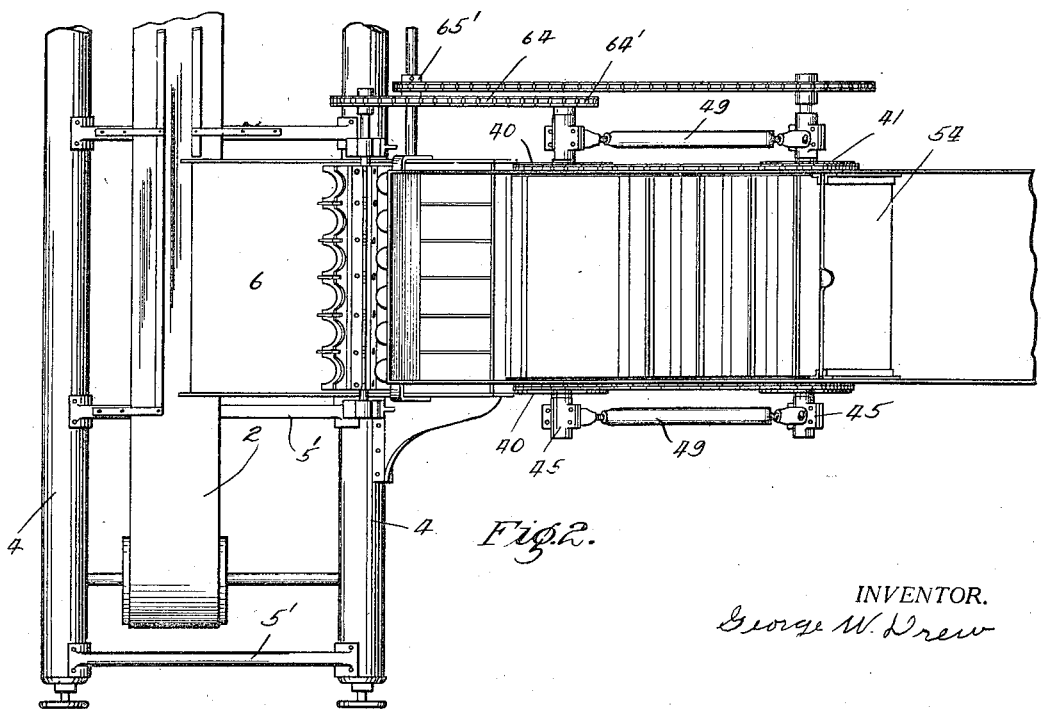
Fig. 2 is a view in plan of the same.

The essential feature of my invention is the turning mechanism denoted in general by 5, and the preferred embodiment of which is shown in Figs. 1 to 4 inclusive. Forming a part of this mechanism is the shallow inclined chute 6, down which the pieces of fruit travel to the belt 2. On the under side of 6 is attached bearing brackets 7 in which are pivotally mounted rods 8. To the latter are attached certain adjusting members 9, that are formed in two parts; a sleeve 10 and a screw 11. The upper ends of the sleeves are attached to the rods 8, while the lower ends are provided with flanges 12. The sleeves are hollow to provide a cavity into which the screw member can freely move. 13 denotes a handwheel having the ears 14 that are adapted to engage the flange 12 on members 10. The wheel also has an interiorly screw threaded lug 13' which is adapted to engage the screw member 11, so that when the handwheel is turned, the screw is caused to move in or out of the sleeve, depending on the direction which the wheel is rotated.

Denoted by 15 are the main supporting members for the feeding device, these members being attached to the frame of the slicing machine and suitably braced. To the upper flanges of these members are attached brackets 18, having upright bearing arms 16. Pivotally mounted in these arms are short stub shafts 17, in the outer ends of which are held the screws 11. Two sets of these adjusting members are provided, the upper set being mounted as just described, while the lower set have their screws engaging a shaft 18' which in turn is pivotally mounted in brackets 19 extending outwardly from one of the members 4.

As it is not desirable to have the chute on too much of an inclination, due to the fact that the fruit would pile up back of the turning wheel, and as this inclination is not sufficient to cause the fruit to freely slide down the chute, I provide means for shaking it so that the fruit will be urged toward the lowermost point. This shaking mechanism is shown in detail in Figs. 10 and 11, wherein 20 denotes the main driving shaft, revolubly journaled in bearings 21. Keyed or otherwise attached to this shaft, and thus held in spaced relation, are two disks 22. Between the latter is an annular member 23, having hubs 24 at diametrically opposite points, in which are fixed shafts 25 and 26. These shafts are slidably mounted in bearings 27 and 28 which together with bearings 21 are a part of a suitable bracket member 29, rigidly attached to one of the longitudinal members of the frame 1.

Between the disks 22 extend the bolts or pins 31, on which are revolubly mounted rollers 32. These pins are odd in number, the number depending on the rapidity of the vibratory movement to be imparted to the chute. Within the ring 23 are two contact plates 30 and 33, the former being fixed to the ring 23 as shown, while the latter is adjustable by means of screws 34 and 35. Screws 35 are threaded on their outer ends and engage correspondingly threaded holes in plate 33. Screws 34 are threaded externally and engage threaded openings in the ring 23. The screws 34 are also provided with central openings through which the screws 35 may pass. Heads of screws 34 rest on the heads of screws 35 and the outer ends of the latter rest against the surface of plate 33. By this arrangement the turning of screws 34 will move plate 33 radially with respect to shaft 20 and so permit some adjustment of the amount of vibration.

The outer end of shaft 26 is pivotally connected to the lower end of a lever 26', which in turn is pivotally mounted as at 27'. The opposite end of this lever is attached to one end of a link 28', the opposite end of which is pivotally connected to a bracket 29' on the bottom of the chute 6. By this construction the rotation of the disks 22 will cause the rollers 32 to contact, first with plate 30 and then with plate 33, moving ring 23 an amount depending on the position of the plate 33. This movement is communicated through shaft 26, lever 26' and connecting rod 28' to the chute 6 and it will be understood that the greater the number of rollers employed the more rapid will be the vibrations.

The mechanism for feeding the turner 5 will next be described. This consists of a hopper 38 into which the pieces of fruit are deposited, and a conveyer 39 to carry the pieces from there to the turning device. The conveyer has two pairs of sprocket wheels 40 and 41, connected by the sprocket chains 42. The pairs of wheels are keyed to shafts 43 and 44 respectively, the shafts in turn being journaled in bearings 45, each of which is provided with an extension lug 46. The latter are pivotally mounted in clevises 47, making the bearing self-alining in one direction. Each clevis is formed with a threaded rod 48 which engages one end of a bar 49 thus enabling the distance between the shafts 43 and 44 to be adjusted. Bars 49 are attached to brackets 15, and brace rods 50' are provided to assist in supporting the outer end of the device.

Extending the entire width of the conveyer between the opposite chains 42 are buckets 50, these buckets being attached to suitable links forming a part of the chain. Just inside of the line of travel of the buckets is a plate 51 which prevents the fruit from falling out of the back of the bucket, and on the sides are plates 52, which are a substantial continuation of the side walls of the hopper. The bottom of the latter is curved as at 53 to retain the contents, and within the hopper is a sliding plate 54 arranged to provide an adjustable opening between its lower edge and the bottom of the hopper. This construction enables the amount of fruit fed by the conveyer to the turning device to be regulated in accordance with the capacity of the latter.

I will now describe the turning mechanism, as illustrated in Figs. 1 to 4 inclusive.
Mounted on the upwardly extending arms 55 of brackets 18 are vertically adjustable bearings 56. Journaled in these bearings is a shaft 57' carrying a drum 58, the length of which is the same as the width of chute 6.
On the periphery of this drum are attached vanes 57, and the drum is adjusted in height so that the tips of these vanes just clear the bottom of the chute. The outer edges of the vanes are provided with semi-circular notches 58', that are approximately equal in size to the largest piece of fruit on which the machine will be used. Between notches 58' are radial slots 59 to enable the vanes to pass certain partition walls 60, which extend from a point below the center of the drum 58 to the upper end of the chute. The walls 60 are curved as at 61, the radius of curvature being equal to the radial distance to the bottom of slots 59, both being taken from the center of shaft 57.

The upper end of the conveyer casing is provided with an extension 62, that projects over the upper end of chute 6, thus causing the fruit to be dumped into the latter between the partition walls 60. To prevent any jumping out of the fruit, between the extension 62 and the turning wheel and yet give easy accessibility to the space back of this wheel, there is provided removable guard plates 63.

Drum 58 is driven by a sprocket chain 64 from a toothed wheel 64' attached to shaft 43. The latter is driven from the lower shaft 44 by the conveyer chain, and the lower shaft is in its turn driven by a chain from toothed sprocket wheel 65' on the main shaft 20.

Referring to the modified form of turner shown in Figs. 6 and 7, it will be noted that a shaft 65 is provided with a single vane 66 of the same general contour as vanes 57. This shaft is journaled in adjustable bearings as is shaft 57', but has a crank arm 67 on its outer end which is oscillated from a crank pin 68 on shaft 43.

In the form shown in Figs. 8 and 9, the vanes 71 are of the same general contour and are mounted at each end on a sprocket chain 69. These chains run over sprocket wheels 75, keyed on shafts 70 that in turn are journaled in bearings arranged near the top and the bottom of the chute. The upper shaft 70 is driven from sprocket wheel 64' as previously described for shaft 57'.

In the form shown in Figs. 12 and 13, the turning wheel denoted in general by 80, is of the same construction as that illustrated in Figs. 1 to 4, and is mounted in vertically adjustable bearings in the same manner. Instead of the shaking chute, I provide a moving fruit supporting surface in the form of a belt conveyer on which the pieces to be turned are deposited.

This conveyer belt denoted in general by 81, passes over suitable drums 82 and 83, the former of which is driven by a sprocket chain 89 from the shaft of wheel 80, the latter in its turn being driven from shaft 43 by the sprocket chain 91. In this manner the belt 81 travels in the direction opposite to that of the vanes on the lower part of the wheel 80.

The partition walls 84 are the same as those previously described, with the exception that they are held clear of the belt. Side walls 85 are provided at the edge of the belt and at the discharge end is an inclined board 90 leading to the conveyer 2.

The shaft of drum 83 is journaled in bearings 86 which are slidably mounted on guide rails 87 and provided with weights 88 or other means for maintaining an even tension on the belt 81. In this form of the device I find it desirable to give the belt 81 an upward inclination as this makes the halves of the fruit easier to turn. This will be apparent, the wheel and the belt are moving in opposite directions and with the pieces resting on their rounded sides and on the inclined surface, only a slight impulse from the vanes will be required to turn it over backwardly.

The operation of the device is as follows:

Fruit placed in the hopper of the conveyer is carried by the latter to the discharge end where it is thrown into the chute 6 between the division walls 60. These walls are spaced only slightly farther apart than the width of the pieces of fruit, hence as the latter move downwardly under the impulses of the shaking mechanism, they are brought into alinement with the notches 58'. Now if the pieces are lying on the bottom flat side down, they will pass through the openings between the vanes and the chute bottom, but if they are lying on their rounded side they cannot so pass.

As the vanes and the pieces are moving in the opposite directions the tendency will be for the vanes to catch the pieces and turn them over. This tendency is materially assisted by the other descending pieces, which get under the first piece and raise it to a partially tilted position so that very little effort is required by the vane to completely turn it over.

The modified forms act in the same way, the oscillating vane drive being so arranged that it has a quick forward and back movement that is very effective in turning the 12 pieces. The form shown in Figs. 8 and 9 is particularly effective where the pieces are subject to considerable variation in size.

This is due to the fact that on their downward journey the pieces have to pass several vanes, and if they get past one in the wrong position they are more apt to be picked up by one of the following vanes. The form shown in Figs. 12 and 13 is especially adapted for rapid work. This is due not only to the quicker movement of the fruit past the knives, but also to the more rapid turning of the pieces.

While I have shown the preferred embodiments of my invention together with several modifications of the turning mechanism, it will be understood that I do not wish to limit myself to the exact structure here shown, but wish to cover all forms within the scope of the claims.

I claim:

1. A machine for positioning pieces of fruit, comprising a movable fruit supporting member, and vanes having notches along their outer edges, said notches being adapted to coöperate with said member to form openings through which said fruit may pass when properly positioned.

2. A machine for turning fruit comprising a movable fruit supporting member, a plurality of division walls extending longitudinally of said member, vanes having semi-circular notches adapted to coöperate with the surface of said member to form openings through which the fruit may pass, and means for moving said vanes in a direction parallel to the movement of the fruit on said chute.

3. A machine for positioning pieces of fruit, comprising a fruit supporting member, vanes having openings adapted to allow said pieces to pass only when arranged in a given position, and means for moving said vanes and said supporting member in opposite directions.

4. A machine for arranging pieces of fruit all in a given direction comprising a fruit supporting member, vanes movable above said member in a direction parallel to the movement of the fruit therein, and having openings adapted to allow the pieces of fruit to pass when properly arranged, and means for feeding said pieces to said member.

5. A machine for turning semi-spherical pieces of fruit flat side downward, comprising a feed conveyer, a movable fruit supporting surface positioned under the tail end of said conveyer, a plurality of division walls above said surface, vanes positioned above said surface and movable in a direction opposite the direction of travel of the fruit, and having semi-circular notches to allow said pieces to pass the vanes when positioned flat side down on said supporting surface.

6. A machine for arranging pieces of fruit in a uniform manner comprising a feed conveyer, an inclined movable supporting surface, vanes having notches conforming to the curved side of said fruit said notches coöperating with said surface to permit movement of the pieces of fruit along said surface only when positioned in a given manner.

7. A machine for turning substantially semi-spherical pieces of fruit flat side down, comprising a feed conveyer, a movable supporting member, a plurality of division walls forming runways for said pieces, vanes having semi-circular notches, said notches being adapted to coöperate with the surface of said member to form openings through which said pieces may pass when positioned flat side downwardly.

8. A machine for turning pieces of fruit comprising moving vanes having semi-circular notches, a support for said pieces positioned below said vanes, said vanes being movable in a direction opposite the direction of movement of the said pieces along said support.

9. A machine for turning pieces of fruit comprising movable vanes having semi-circular notches, and means for conveying said pieces past said vanes in a direction opposite the direction of movement of said vanes.

10. A machine for turning pieces of fruit comprising movable vanes having semi-circular notches, a belt conveyer positioned under said vanes and movable in the opposite direction from said vanes.

11. A machine for turning pieces of fruit comprising a belt conveyer, a plurality of movable vanes positioned above said conveyer with their outer edges almost in contact therewith and movable in the opposite direction thereto, said vanes having notches corresponding in contour to the pieces of fruit, means for maintaining a uniform tension on said conveyer belt, and means for removing said pieces from said belt.

12. A machine for turning pieces of fruit comprising an inclined support along which said pieces are movable, vanes having semi-circular notches positioned above said support, said notches coöperating with the surface of said support to form openings through which said pieces may pass when positioned in a given direction and said vanes being movable in a direction opposite the movement of said pieces along said support.

13. A machine for turning pieces of fruit comprising movable vanes having notches conforming to the contour of the pieces of fruit, means for conveying said pieces past said vanes in a direction opposite the movement thereof, and division walls for directing said pieces toward said openings.

14. A machine for turning pieces of fruit comprising movable vanes having semi-circular notches, a belt conveyer positioned under said vanes and movable in the opposite direction from said vanes, and parallel division walls positioned above said conveyer for directing said pieces toward said notches.

15. A machine for turning pieces of fruit comprising a belt conveyer, movable vanes positioned above said conveyer having notches adapted to coöperate with the surface of said belt to form openings through which said pieces may pass when turned in a given direction, and parallel division walls for directing said pieces toward said openings.

In testimony whereof I affix my signature.

GEORGE W. DREW.